(12) United States Patent
Inamitsu et al.

(10) Patent No.: US 6,367,696 B1
(45) Date of Patent: Apr. 9, 2002

(54) IC CARD PROCESSING DEVICE, AUTOMATIC VENDING DEVICE, AND SELLING METHOD

(75) Inventors: Tetsuharu Inamitsu, Chigasaki; Masayuki Inoue, Fujisawa; Koichi Yoneta, Yokohama; Shigeyuki Itoh, Zushi; Yutaka Takami; Kenji Matsumoto, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/498,817

(22) Filed: Feb. 4, 2000

(30) Foreign Application Priority Data

Feb. 5, 1999 (JP) .......................... 11-028216

(51) Int. Cl.$^7$ ................................. G06F 7/08
(52) U.S. Cl. ................. 235/381; 235/380; 235/383; 235/375
(58) Field of Search .................. 235/380, 381, 235/382, 375, 383; 705/14, 22, 41

(56) References Cited

U.S. PATENT DOCUMENTS

| | | | | |
|---|---|---|---|---|
| 3,807,541 A | * | 4/1974 | Kortenhaus | 194/1 N |
| 3,815,720 A | * | 6/1974 | Machanian et al. | 194/15 |
| 5,222,624 A | * | 6/1993 | Burr | 221/1 |
| 5,450,938 A | * | 9/1995 | Rademacher | 235/381 X |
| 5,491,326 A | * | 2/1996 | Marceau et al. | 235/381 |
| 5,687,322 A | * | 11/1997 | Deaton et al. | 235/375 |
| 5,734,150 A | * | 3/1998 | Brown et al. | 235/381 |
| 5,745,052 A | * | 4/1998 | Matsuyama et al. | 235/380 X |
| 5,788,115 A | * | 8/1998 | Halliburton | 221/155 |
| 5,914,471 A | * | 6/1999 | Ven De Pavert | 235/380 |
| 5,979,773 A | * | 11/1999 | Findley, Jr. et al. | 235/492 |
| 5,988,346 A | * | 11/1999 | Todesco et al. | 235/381 |
| 5,996,765 A | * | 12/1999 | Ock | 194/217 |
| 6,085,888 A | * | 7/2000 | Todesco et al. | 235/381 X |
| 6,109,524 A | * | 8/2000 | Kanoh et al. | 235/381 |
| 6,161,059 A | * | 12/2000 | Todesco et al. | 235/381 X |
| 6,230,150 B1 | * | 5/2001 | Walker et al. | 705/400 |

FOREIGN PATENT DOCUMENTS

| | | | |
|---|---|---|---|
| JP | 10188093 A | | 7/1998 |
| JP | 02000348241 A | * | 12/2000 |

* cited by examiner

*Primary Examiner*—Karl D. Frech
*Assistant Examiner*—Daniel Walsh
(74) *Attorney, Agent, or Firm*—Townsend and Townsend and Crew LLP

(57) ABSTRACT

In a vending machine selling products and services without human attendance, at a point of sale, a discounting service is provided to each purchaser according to the frequency-of-purchase record of respective purchasers. A microcomputer 2 collects electronic money corresponding to prices of products purchased from a product purchaser's IC card 8 inserted into an IC card reading apparatus 1 by each purchaser, and transfers it to a product seller's IC card. Further, on this occasion, the number of times of purchase corresponding to a personal ID stored in a product purchaser's IC card 8 is stored on the number of-times of purchase list of the memory unit 3, and a personal ID is registered on the personal ID list of a memory unit 3. When the number of times of purchase exceeds the reference number of times of purchase, when collecting e-money from the product purchaser's ID card 8 whose personal ID is registered on the personal ID list, the microcomputer 2 applies a discounted price as a price for the purchased product.

36 Claims, 16 Drawing Sheets

FIG.10

| NAME OF PRODUCT | DISCOUNT RATE |
|---|---|
| PRODUCT A | 10% |
| PRODUCT B | 5% |
| PRODUCT C | 0% |
| PRODUCT D | 7% |
| PRODUCT E | 0% |

FIG.14

| NAME OF REGISTERED E-MONEY | DISCOUNT RATE |
|---|---|
| E-MONEY A | 20% |
| E-MONEY B | 30% |
| E-MONEY C | 40% |

IC CARD PROCESSING DEVICE, AUTOMATIC VENDING DEVICE, AND SELLING METHOD

BACKGROUND OF THE INVENTION

For person-to-person sales, there are many added benefits possible for customers. For example, a discount can be offered to customers in accordance with their quantity of purchases of products or service in a fixed period of time, or a discount may be offered to customers on their birthdays. A store may give coupons or points to every customer on every purchase, and offer a discount or a premium to them for their coupons or points when their coupons or points add up to a prescribed amount. A restaurant may offer a discount or a free dessert to customers who visit on their birthdays.

In the case of vending machines, which sell products without human attendance, however, added benefits on sales are offered to all purchasers evenly or on an even probability. For example, a soft-drink vending machine with a lottery function offers one more bottle to any purchaser who happens to draw a winning number. On the other hand, payment settling methods with IC cards (also known as smart cards) have recently been proposed and experimented with. One form of such is IC card-type credit cards, while another form is electronic money, or e-money. For instance, one such method is disclosed in Japanese Patent Laid-open Publication No. 10-188093.

SUMMARY OF THE INVENTION

Electronic money is stored in the memory of an IC card. When transaction are made, instead of cash money, e-money is interchanged between IC cards. Such an interchange of e-money between IC cards is made by IC card writing/reading apparatus which reads and writes information from and into IC cards.

Because conventional vending machines with added benefit functions serve purchasers in similar ways, it is difficult for any of such vending machine to gain an advantage over the others. If a vending machine, however, is capable of offering particular benefits in accordance with a characteristic of each purchaser, as in the case of sales with human attendance, it can gain an advantage over the others and attract more purchasers. If vending machines with such capability are introduced into the market, they bring more competition into the market.

For a vending machine to offer added benefit to individual purchasers for their accumulated points, the vending machine has to issue a card to each purchaser to manage his or her point data, or write a special application program into, and secure an exclusive storage area in, the memory of each customer's IC card. The cost of issuing such purchaser's IC cards, however, would be burdensome for such a vending machine selling low-priced products to the general public, or it would be burdensome for such an IC card to take in and keep a number of vending machine-specific programs and provide and maintain a number of vending machine-specific storage areas.

Assume that each time one uses a different vending machine, a storage area in his or her IC card is allocated to the vending machine to offer an added benefit for accumulated points. A typical IC card presently in use has a memory of about 8 KB. Its IC card-management of OS and an e-money application program, if installed, typically would occupy more than 7 KB, leaving less than 1 KB free. Such an IC card cannot afford to store the ID data of all vending machines which the owner of the IC card happens to encounter, nor the data of points collected from all such vending machines. In addition, it would not be easy to delete data stored in an IC card because data are stored in particular formats and, hence, stored data have to be deleted in accordance with particular protocols. Accordingly, once an IC card is filled with data from a number of vending machines, it would be difficult for the owner of the IC card to control its memory appropriately.

In accordance with the above, the present invention improves the attraction of each vending machine for purchasers by relieving such burden on such IC cards and offering added benefit to individual purchasers in accordance with their individual characteristics.

To solve the above problems, the present invention provides an automatic vending device for products or services. The automatic vending device uses an IC card, and each IC card stores "sum-of-money" information enabling the settlement of purchases and ID information enabling the identification of the IC card, or the owner or user of the IC card. The automatic vending device includes a means for collecting money for products or service sold, a means for storing the extent of purchases made with each IC card, linking the extent of purchases to the ID information stored in the IC card, and a means for controlling the automatic vending, device so that when the degree of purchase made with each 1C card meets a prescribed condition, an added benefit is offered to the purchaser using the IC card.

In accordance with another aspect of the present invention, an IC card processing device is connected to an automatic vending device of products or services. The automatic vending device uses IC cards, and each IC card stores "sum-of-money" information enabling the settlement of purchase amount of money and ID information enabling the identification of the IC card, or the owner or user of the IC card. The IC card processing device includes a connector for connecting the IC card processing device to the automatic vending device, a means for collecting money for products or service sold, a means for storing the degree of purchase made with each IC card, linking the degree of purchase to the ID information stored in the IC card, and a means for controlling the automatic vending device so that when the degree of purchase made with each IC card meets prescribed conditions, some added benefit maybe offered to the purchaser using the IC card.

In another aspect of the present invention, there is provided a selling method wherein an automatic vending device of products or service is used. IC cards can be fitted in the automatic vending device, and each IC card stores sum-of-money information enabling the settlement of purchase amounts and ID information enabling the identification of the IC card, or the owner or user of the IC card. The selling method comprises a step of collecting money for products or service sold, a step of storing the degree of purchases made with each IC card, linking the degree of purchases to the ID information stored in the IC card, and a step of controlling the automatic vending device so that when the degree of purchases made with each IC card meets prescribed conditions, an added benefit is offered to the purchaser using the IC card.

One feature of the present invention is that the sum-of-money information is information on e-money with which settlement can be effected electronically. Another feature of the present invention is that the sum-of-money information is credit information with which electronic charging processing can be made. An additional feature of the present invention is that the degree of purchase made with each IC card is expressed in a numerical magnitude corresponding to the number of times collection of money under the IC card, or the quantity or the kinds of products or services which the money has been collected for under the IC card, or the sum of money collected from the IC card.

Further features of the invention are that time-period information fixing a period is stored and the degree of purchase made with each IC card is based on the purchase made with the IC card during the period governed by the time-period information; that the added benefit is a discount off prices to be collected electronically by the means for collecting money for products or service sold; that the added benefit is to offer products or services free of charge; that a discount rate is set and stored for each kind of product or service and the discount is by the discount rate; that the ID information is the personal information of the owner of each IC card, and when the personal information meets prescribed conditions, added benefit is offered; and that the personal information includes the birthday of the owner of each IC card.

BRIEF DESCRIPTION OF THE DRAWINGS

These and other features, objects, and advantages of the present invention will become more apparent from the following description when taken in conjunction with the accompanying drawings wherein:

FIG. 10 is a table of discount rates by product to be stored in a memory of an automatic selling system in accordance with the fourth embodiment of the present invention;

FIG. 14 is a table of discount rates by the type of e-money to be stored in a memory of an automatic selling system in accordance with the fourth embodiment of the present invention;

DESCRIPTION OF THE SPECIFIC EMBODIMENTS

Figure 1:
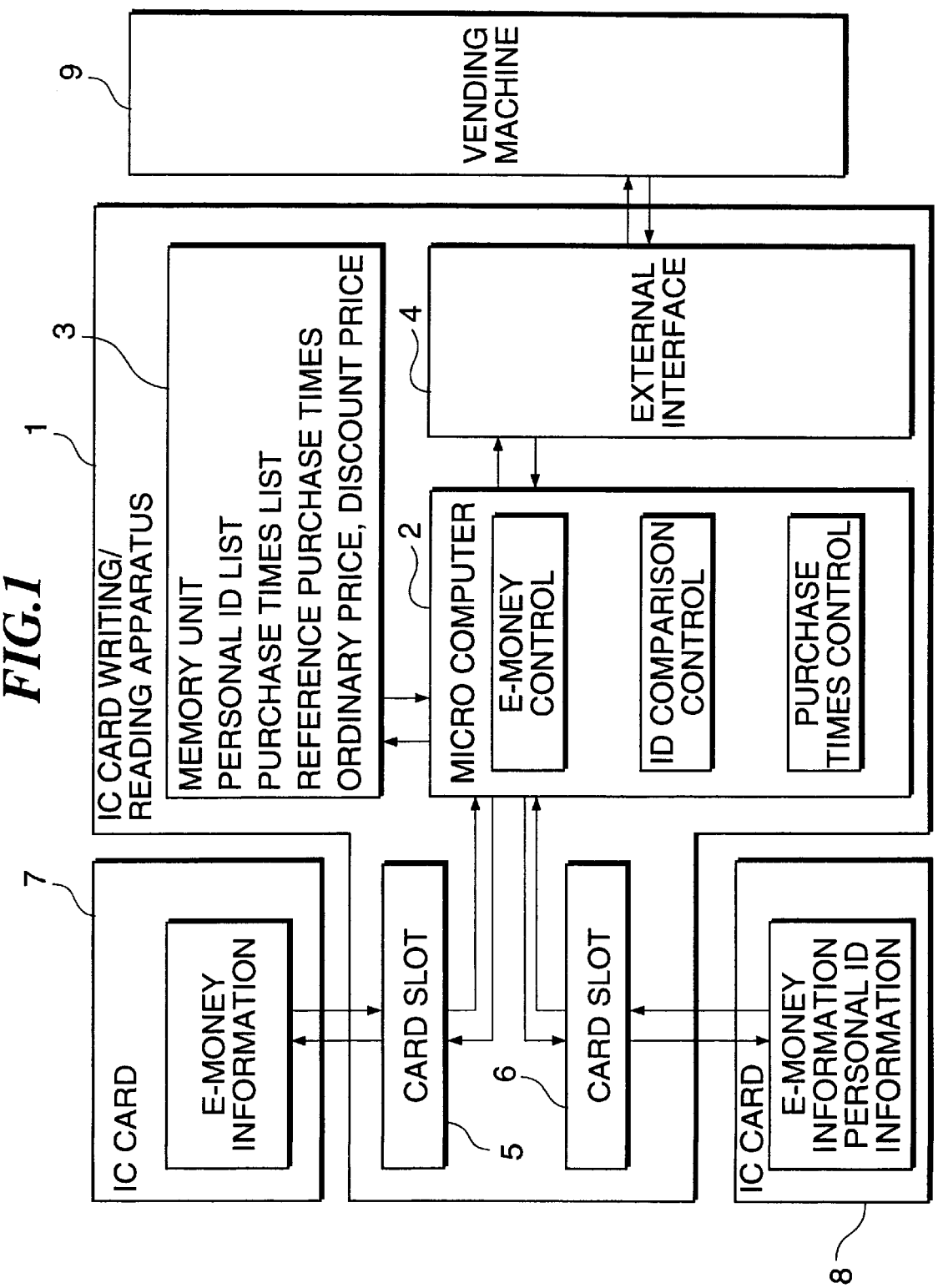
FIG. 1 is a block diagram of an automatic selling system in accordance with a first embodiment of the present invention.

Preferred embodiments of the present invention will now be described. FIG. 1 shows a configuration of an automatic selling system in accordance with the first embodiment. In FIG. 1, vending machine 9 stores and dispenses products to purchasers. An IC card 1 writing/reading apparatus collects money for products dispensed to purchasers. The IC card writing/reading apparatus transfers e-money between two IC cards. A seller's IC card for collection 7 and a purchaser's IC card for payment 8 are fitted in the IC card writing/reading apparatus.

The seller's IC card 7 is, in advance, fitted into a card slot 5 of the IC card writing/reading apparatus 1. The purchaser's IC card 8 is fitted into a card slot 6 by the purchaser when the purchaser buys a product. Both the seller's IC card 7 and the purchaser's IC card 8 are IC cards to store e-money. The purchaser's ID code is stored in the purchaser's IC card 8. A social security number may be used as the purchaser's ID code.

The IC card writing/reading apparatus 1 is connected to the vending machine 9 through an external interface 4 by control wires. When the purchaser's IC card 8 is inserted in the card slot 6, a microcomputer 2 of the IC card writing/reading apparatus 1 transfers, from the purchaser's IC card 8 to the seller's IC card 7, e-money for the product which the purchaser bought from the vending machine 9. The microcomputer 2 can also control the operation of the vending machine 9 through the external interface 4.

If the IC card writing/reading apparatus 1 is given the same shape as the identification unit of notes and coins of the conventional vending machine, the note-and-coin identification unit can be replaced with the IC card writing/reading apparatus 1 and the conventional vending machine can use the IC card writing/reading apparatus 1. The entire function of the IC card writing/reading apparatus 1 may be built in the automatic vending device.

The IC card writing/reading apparatus 1 has a memory unit 3, wherein a list of personal ID codes of purchasers entitled to added benefit, a list of the number of times of purchase made by each purchaser on the personal ID code list, ordinary prices and discount prices of products, and a reference number of times of purchase for purchasers'eligibility for discount prices are stored. In the following embodiment, it is assumed that all the products sold by the vending machine 9 carry one and the same price, however, as will be seen different prices may also be used.

Figure 2:
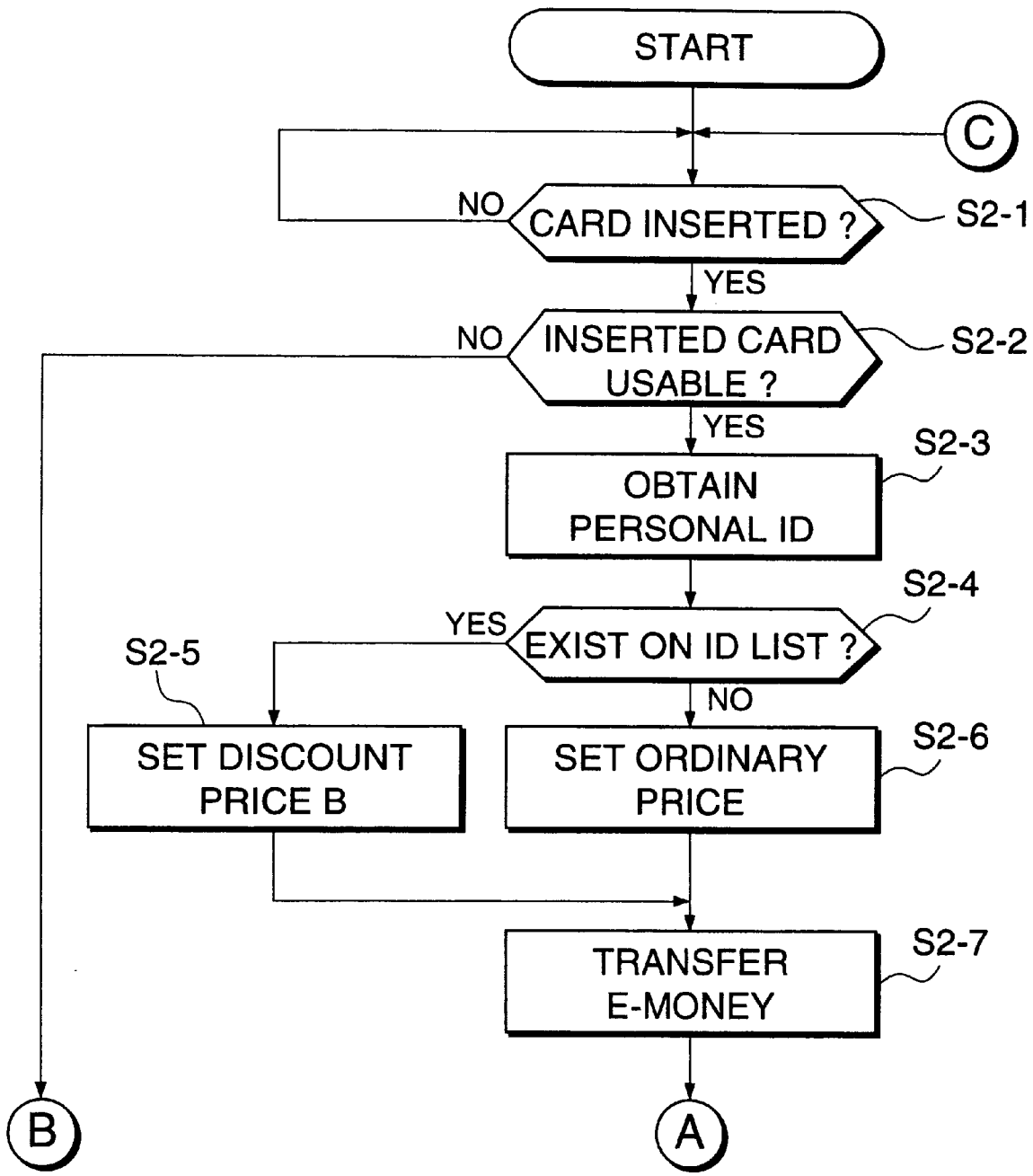
FIG. 2 is a flowchart showing the operation of an automatic selling system in accordance with the first embodiment of the present invention.
Figure 3:
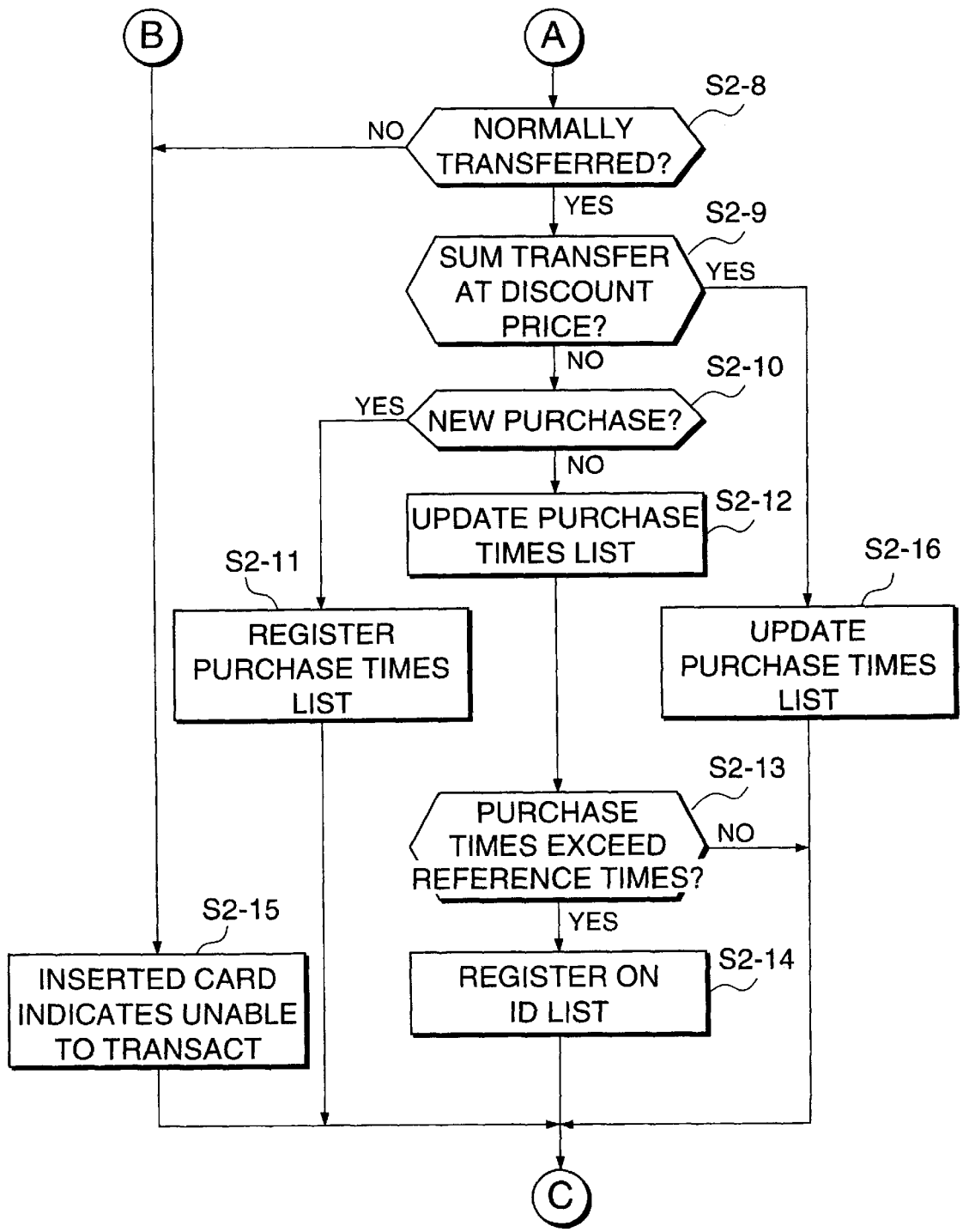
FIG. 3 is a flowchart of the operation of an automatic selling system in accordance with the first embodiment of the present invention.

The operation of the automatic selling system in accordance with this embodiment will now be described. FIGS. 2 and 3 show the operational flow of the automatic selling system. As shown in FIG. 2, when a purchaser's IC card 8 is inserted in the card slot 6 (S2-1), the microcomputer 2 determines whether the purchaser's IC card 8 can be used with the IC card writing/reading apparatus 1 or not (S2-2). The microcomputer 2 makes the determination based on the ATR (Answer To Request) returned from the purchaser's IC card 8.

When the purchaser's IC card 8 is determined to be usable, the microcomputer 2 reads the personal ID code stored in the memory of the purchaser's IC card 8 (S2-3).

Then, the microcomputer 2 checks the personal ID code with those on the personal ID code list stored in the memory unit 3 to be certain that the purchaser is registered on the list (S2-4).

When the purchaser is registered on the personal ID code list, the sum of money to be withdrawn is set to the discount price stored in the memory unit 3 of the IC card writing/reading apparatus 1 (S2-5). When the purchaser is not registered on the personal ID code list, the sum of money to be drawn is set to the ordinary price stored in the memory unit 3 of the IC card writing/reading apparatus 1 (S2-6).

When the purchaser pushes one of the product selection buttons, the vending machine 9 informs the microcomputer 2 of the purchase quantity, the microcomputer 2 transfers the e-money equivalent to the price set in the step S2-5 or S-26, as the case may be, multiplied by the purchase quantity from the purchaser's IC card 8 to the seller's IC card 7 (S2-7).

With reference to FIG. 3, the microcomputer 2 determines whether the transfer has been made normally or not (S2-8). When the transfer has been made normally, the microcomputer 2 instructs the vending machine 9 to dispense the number of units of the item bought by the purchaser. The vending machine 9 dispenses the products in accordance with the instruction.

Then, the microcomputer 2 ascertains whether the transfer of electronic money was made with the ordinary price or the discount price (S2-9). When the transfer has been made with the discount price, the microcomputer 2 adds the number of purchased units to the number-of-times-of purchase list (hereinafter referred to as "NTP list"of the purchaser (S2-16), and returns to the step S2-1.

When the transfer has been made with the ordinary price, the microcomputer 2 checks the NTP lists in the memory unit 3 to determine whether the purchaser's IC card 8 has been used in the vending machine 9 for the first time or not (S2-10). When the purchaser's IC card 8 has been used for the first time, the microcomputer 2 registers a NTP list for the personal ID code of the purchaser (S2-11) in the memory unit 3, the NTP list bearing the number of units purchased this time, and returns to the step S2-1.

When the purchaser's IC card 8 has been used in the vending machine 9 previously, the microcomputer 2 adds the number of purchased units to the purchaser's NTP list (S2-12) and reads the number of times of purchase from the NTP list (S2-12) to determine whether the number has reached the reference number stored in the memory unit 3 or not (S2-13). When the purchaser's number of times of purchase has reached the reference number, the microcomputer 2 registers the purchaser's ID code in the personal ID code list stored in the memory unit 3 (S2-14), and returns to the step S2-1. When the purchaser's number has not reached the reference number, the microcomputer 2 returns directly to the step S2-1.

If the purchaser's IC card 8 inserted in the card slot 6 is determined to be unusable by the IC card writing/reading apparatus 1, or if the microcomputer 2 determines that the transfer has not been made normally (S2-8), the microcomputer 2 notifies the purchaser that the purchaser's IC card 8 is unusable (S2-15), and returns to the step S2-1.

According to the above first embodiment of the present invention, the system is capable of making a discount on the prices of products in the vending machine in accordance with the numbers of times of purchase of individual purchasers. The system may read, instead of personal ID codes, other pieces of personal information (for example, purchasers' names) in the IC cards of purchasers to attain the same purpose. The system also may use the ID codes of purchaser's card instead of the personal ID codes. Moreover, the system may count the number of times of purchase for a group, such as each company issuing IC cards, by identifying such a company from the IC cards of purchasers, and use that to determine whether discount is given. The IC card writing/reading apparatus also may read personal ID codes about the means of settlement, namely, e-money or credit. For example, an e-money system is usually regarded as an application program installed in an IC card.

Figure 16:
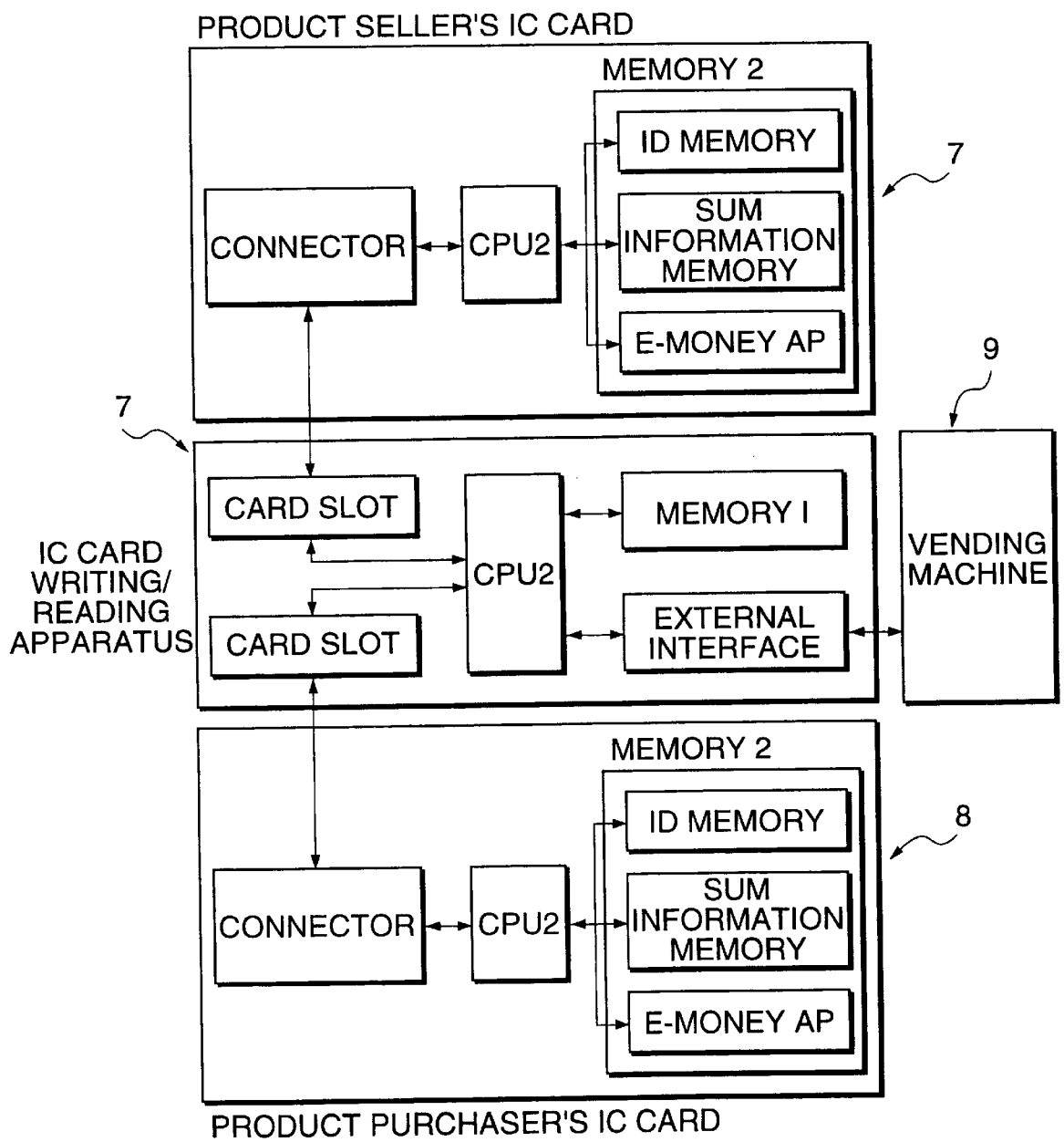
FIG. 16 is a block diagram of a settlement system with IC cards to be used in the present invention.

FIG. 16 shows the details of an IC card wherein an e-money system is installed. The IC card consists of a connector for the connection to an IC card writing/reading apparatus, a CPU-2 for processing, and a memory-2, which further comprises an ID-code storage area, a sum-of-money storage area, and a storage area for application programs for e-money.

In addition, the IC card writing/reading apparatus turns on the power of the IC card and reads the ATR (Answer To Reset). If the ATR is been read normally, the IC card writing/reading apparatus sends the IC card the ID code of an e-money application program to be booted. The CPU2 in the IC card boots an e-money application program identified with the ID code in the purchaser's IC card 8. The IC card writing/reading apparatus reads the sum-of-money information in the sum-of-money storage area of the memory-2 of the purchaser's IC card 8 through the CPU2 of the purchaser's IC card 8 and, at the same time, reads the purchaser's ID-code in the ID-code storage area to store it in the memory-l of the IC card writing/reading apparatus 1. With, the purchaser's ID code, the purchaser is identified. Than, the IC card writing/reading apparatus 1 receives information on the sum of money to be drawn from the vending machine 9 and sends the information on the sum of money to be drawn to the purchaser's IC card 8. The CPU2 of the purchaser's IC card 8 encodes the sum of money and other settlement information and sends the encoded information to CPU2 of the seller's IC card 7 through the IC card writing/reading apparatus 1. The CPU2 of the seller's IC card 7 processes the encoded information and encodes the results to send them to the CPU2 of the purchaser's IC card 8 through the IC card writing/reading apparatus 1. The CPU2 of the purchaser's IC card 8 reads the data received to complete the settlement process. Thus, information on the sum of money is transferred between two IC cards to effect settlement between them. Therefore, security for settlement is high. It is often easier for such an IC card writing/reading apparatus to read personal ID information relevant to settlement than to read personal ID information irrelevant to settlement while processing e-money for settlement in such IC cards of high security.

If an IC card having two or more settlement means is inserted in the card slot, the IC card writing/reading apparatus chooses the settling means tagged with a personal ID code in the IC card which coincides with the personal ID code of the IC card's owner stored in the memory unit 3 so that the owner can accumulate the number of times of purchase with one and the same ID code. Also, may be registered in the IC card writing/reading apparatus to allow the device to choose one of the two or more settling means. Moreover, the IC card writing/reading apparatus may be equipped with a device which allows the purchaser to choose one of the two or more settling means.

An indicator may be connected to the IC card writing/reading apparatus 1 to indicate the number of times of purchase, application or nonapplication of discount, the number of times left before reaching the reference number of times, etc. to purchasers. It is also possible to announce or print out such information. For purchasers who wish to check their purchasing histories, an indicator may be provided which can indicate the purchasing history of each purchaser. Free products, giveaways, service of better quality, lottery tickets, a cash refund, extension of operating hours, coupons, and so on may be offered instead of discount.

Next, an automatic selling system in accordance with the second embodiment of the present invention will be described. The automatic selling system in accordance with the second embodiment is an automatic selling system in accordance with the first embodiment wherein numbers of times of purchase are counted only in a fixed period of time to offer added benefit to purchasers.

Figure 4:
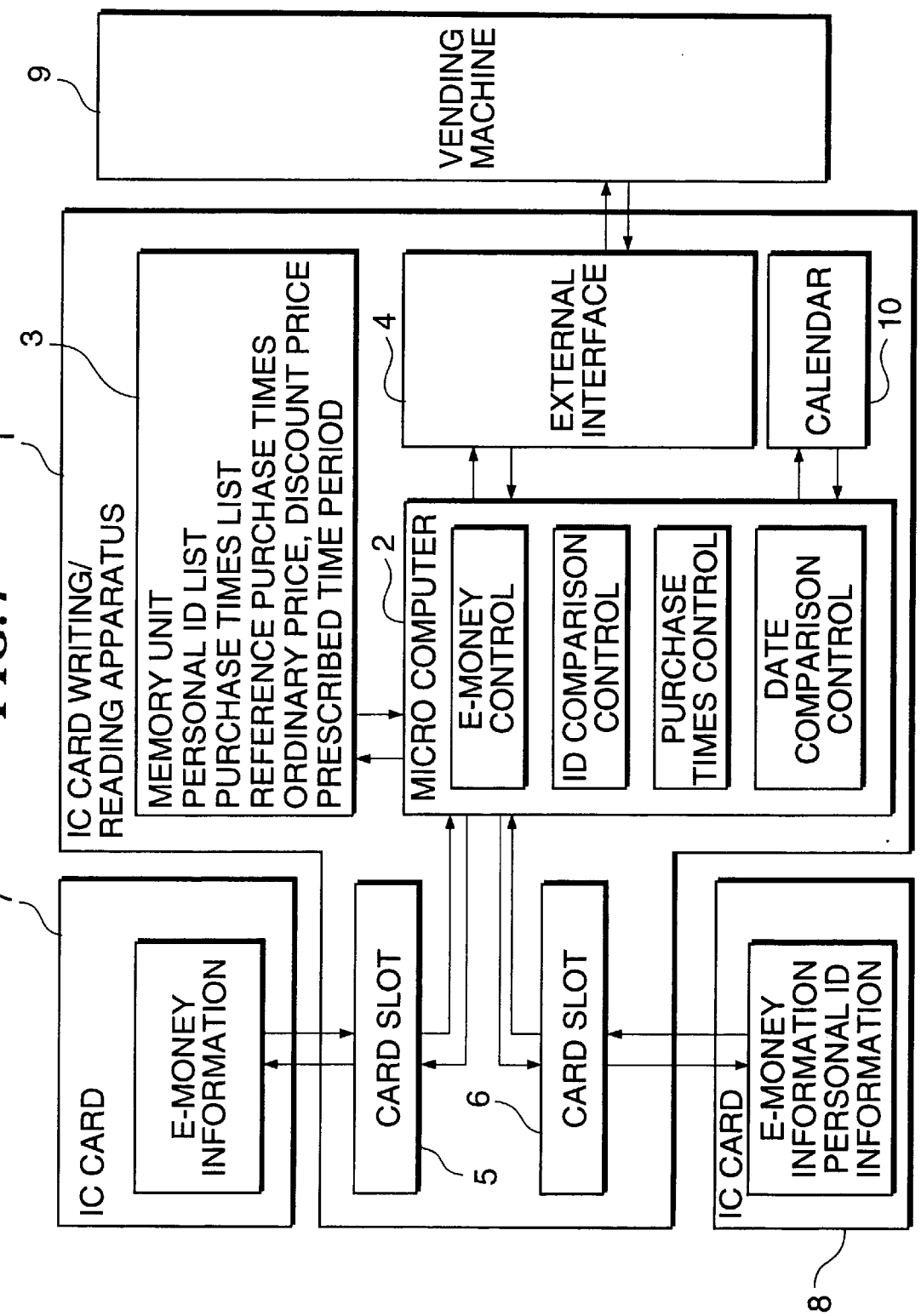
FIG. 4 is a block diagram of an automatic selling system in accordance with a second embodiment of the invention.

FIG. 4 shows the configuration of the automatic selling system in accordance with the second embodiment. As shown in FIG. 4, the automatic selling system in accordance with the second embodiment is the automatic selling system of FIG. 1 wherein a calendar unit 10 for determining the current date is added to the IC card writing/reading apparatus 1 and a storage area for a fixed time period in which numbers of times of purchase are counted is added to the memory unit 3. In addition, each time a purchaser buys products, the date and the quantity of the purchase are registered on his or her list of the number of times of purchase, or NTP list.

Figure 5:
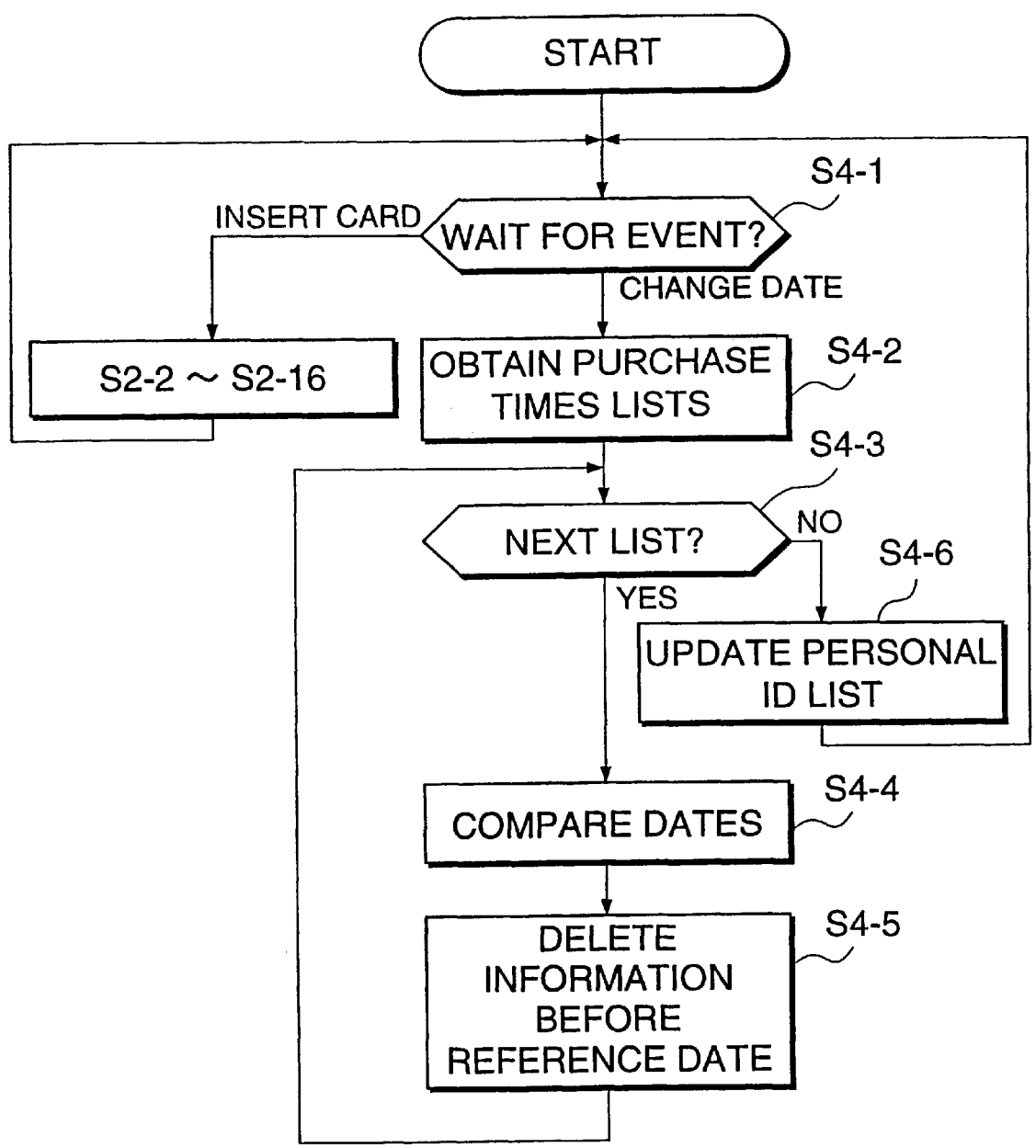
FIG. 5 is a flowchart showing the operation of an selling system in accordance with the second of the present invention.

The operation of the automatic selling system in accordance with the second embodiment will now be described. FIG. 5 shows the operational flow of the automatic selling system. As shown in FIG. 5, when the microcomputer 2 in the state of waiting for an event (S4-1) detects the insertion of an purchaser's IC card 8, the microcomputer 2 carries out the processing from the step S2-2 of FIG. 2 to the step S2-16 of FIG. 3, and returns to the state of waiting for an event (S4-1). In the steps S2-1, S2-12, and S2-16 for registering and updating NTP lists, the microcomputer 2 registers the purchase quantity and the current date read from the calendar unit 10 on the NTP list corresponding to the personal ID code read from the purchaser's IC card 8. In the step S2-13 for determining whether purchasers are registered on the personal ID code list or not, the total number of times of purchase registered on the NTP list of the purchaser is regarded as the number of times of purchase, which is checked with the reference number of times for registration or nonregistration of his or her personal ID code on the personal ID code list.

On the other hand, when the microcomputer 2, while waiting for an event (S4-1), detects the change of date in the calendar unit 10, the microcomputer 2 reads the NTP lists in the memory unit 3 of the IC card writing/reading apparatus 1 (S4-2). Then, the microcomputer 2 subtracts the fixed time period stored in the memory unit 3 from the current date read from the calendar unit 10 to find the reference date, and compares the reference date with the purchase dates on the NTP lists (S4-3, S4-4) to delete the purchase records (each record consisting of a purchase date and a purchase quantity) older than the reference date (S4-3, S4-5).

Then, after processing all the NTP lists, the microcomputer 2 regards the total number of times of purchase of each NTP list as the number of times of purchase, and updates the personal ID code list so that only personal ID codes whose numbers of times of purchase are above the reference number of times are registered in the personal ID code list (S4-6). As described, according to the second embodiment of the present invention, there is provided an automatic selling system which offers added benefit to purchasers in accordance with their numbers of times of purchase in a fixed period of time. It is also possible to offer added benefit to purchasers on the basis of a smaller purchase quantity by multiplying actual number of units purchased by, for example, two in registering purchasers'purchase in their NTP lists for a special period of time.

In the above description, the time period for counting the number of times of purchase has a fixed length and is updated every day. However, a counting period may directly be entered in the storage area in the memory unit 3, or the starting and ending days of a counting period may be entered in the storage area. By checking the last purchase date on every NTP list, the NTP lists of the purchasers whose last purchasing dates go back beyond a fixed number of days may be deleted. Moreover, out of the purchase records registered on each NTP list, records in a fixed time period or such a time period as determined by the current date and a fixed length of period may be counted to determine the total number of times of purchase, which then is regarded as the number of times of purchase for eligibility or noneligibility for added benefit.

Next, an automatic selling system in accordance with the third embodiment of the present invention will be described. This automatic selling system is the automatic selling system in accordance with the first embodiment wherein an additional feature is added. The feature is that if purchasers buy products from the vending machine 9 on their birthdays, an extra discount is made.

Figure 6:
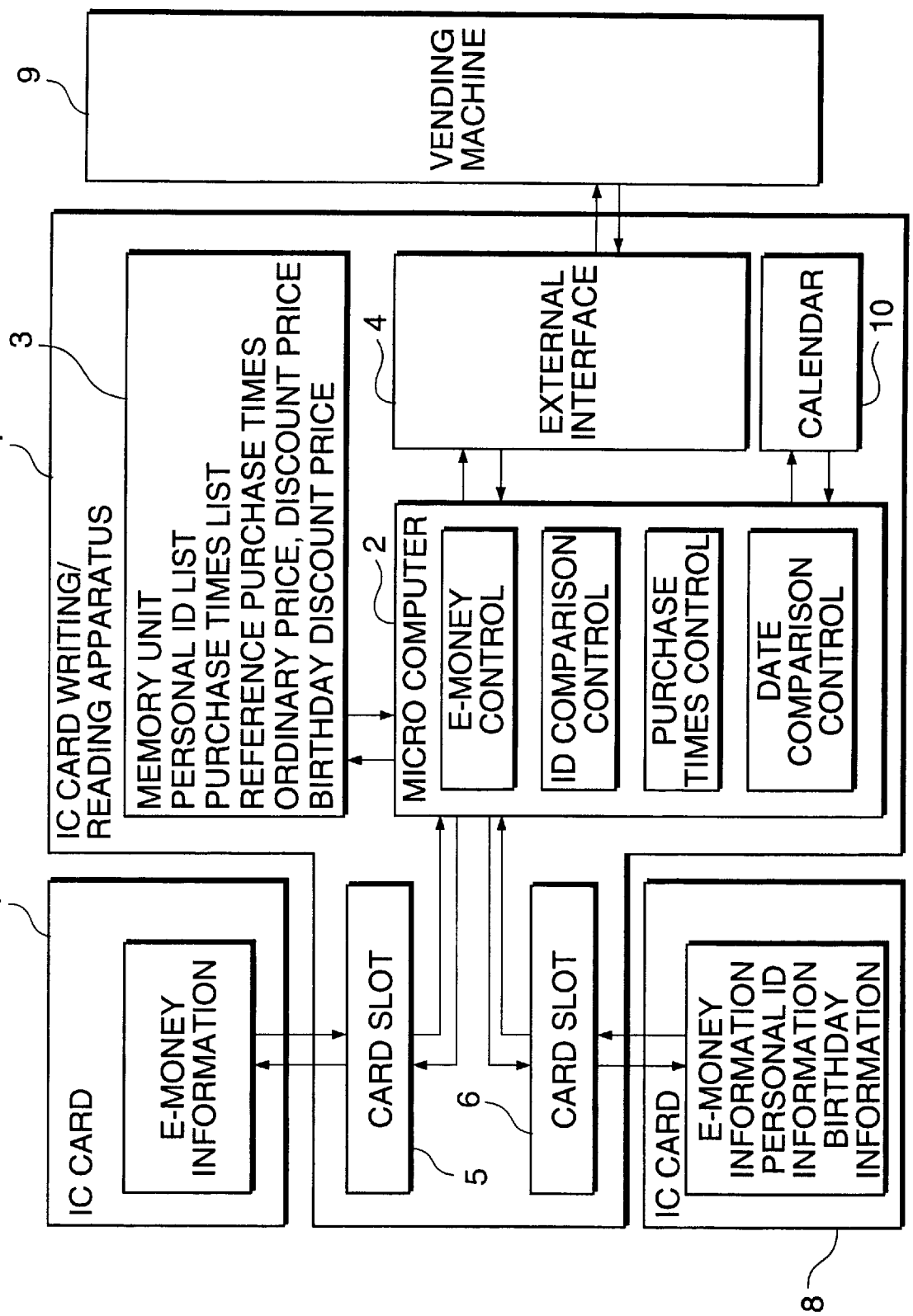
FIG. 6 is a block diagram of an automatic selling accordance with the third embodiment of the invention.

FIG. 6 shows the configuration of the automatic selling system in accordance with the third embodiment. As shown in FIG. 6, the automatic selling system is the automatic selling system of FIG. 1 wherein a calendar unit 10 is added to the IC card writing/reading apparatus 1 and a storage area for a birthday discount price is secured in the memory unit 3. Each IC card 8 stores its owner's birthday.

Figure 7:
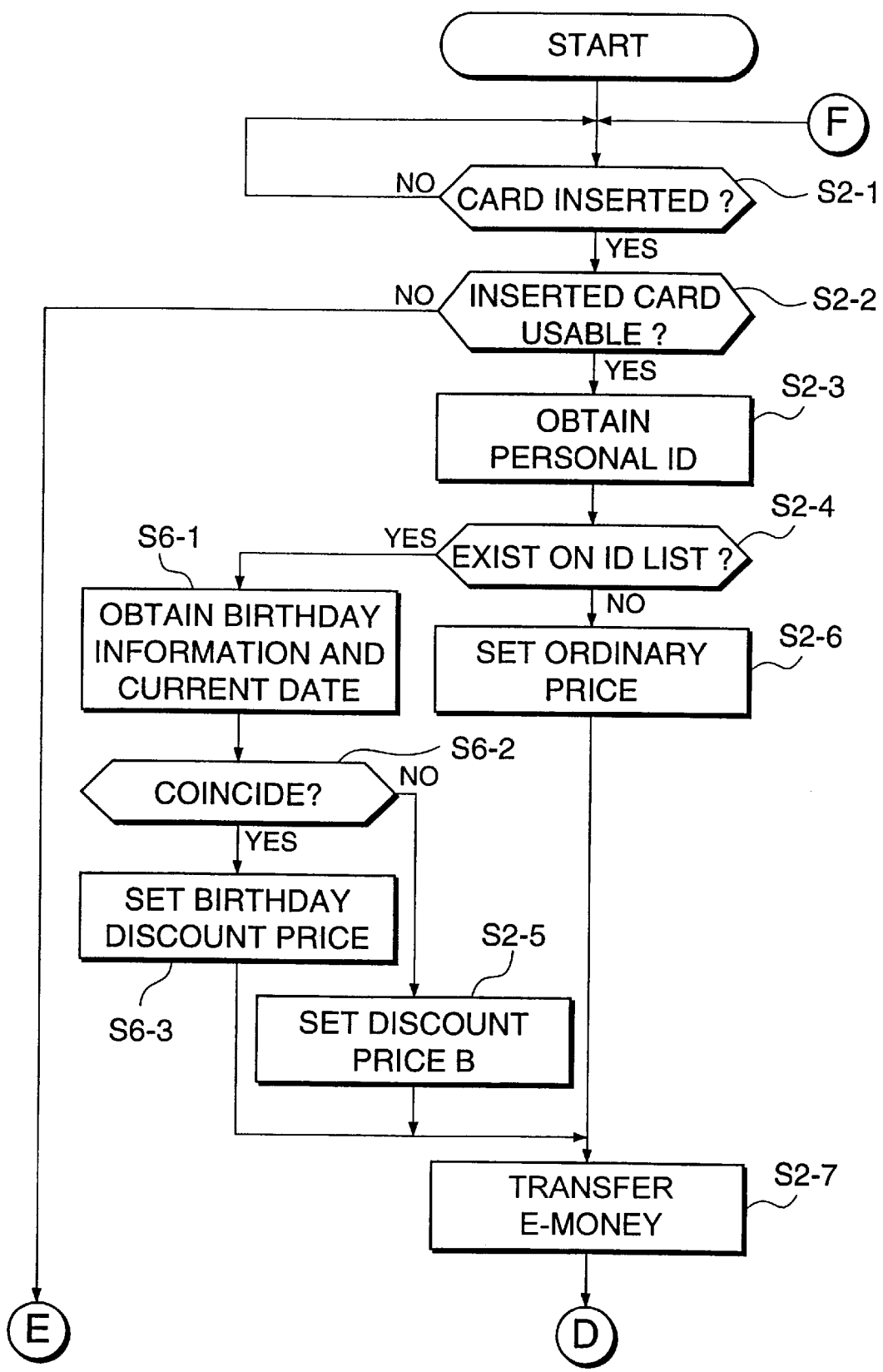
FIG. 7 is a flowchart showing the operation of an selling system in accordance with a third embodiment of the present invention.
Figure 8:
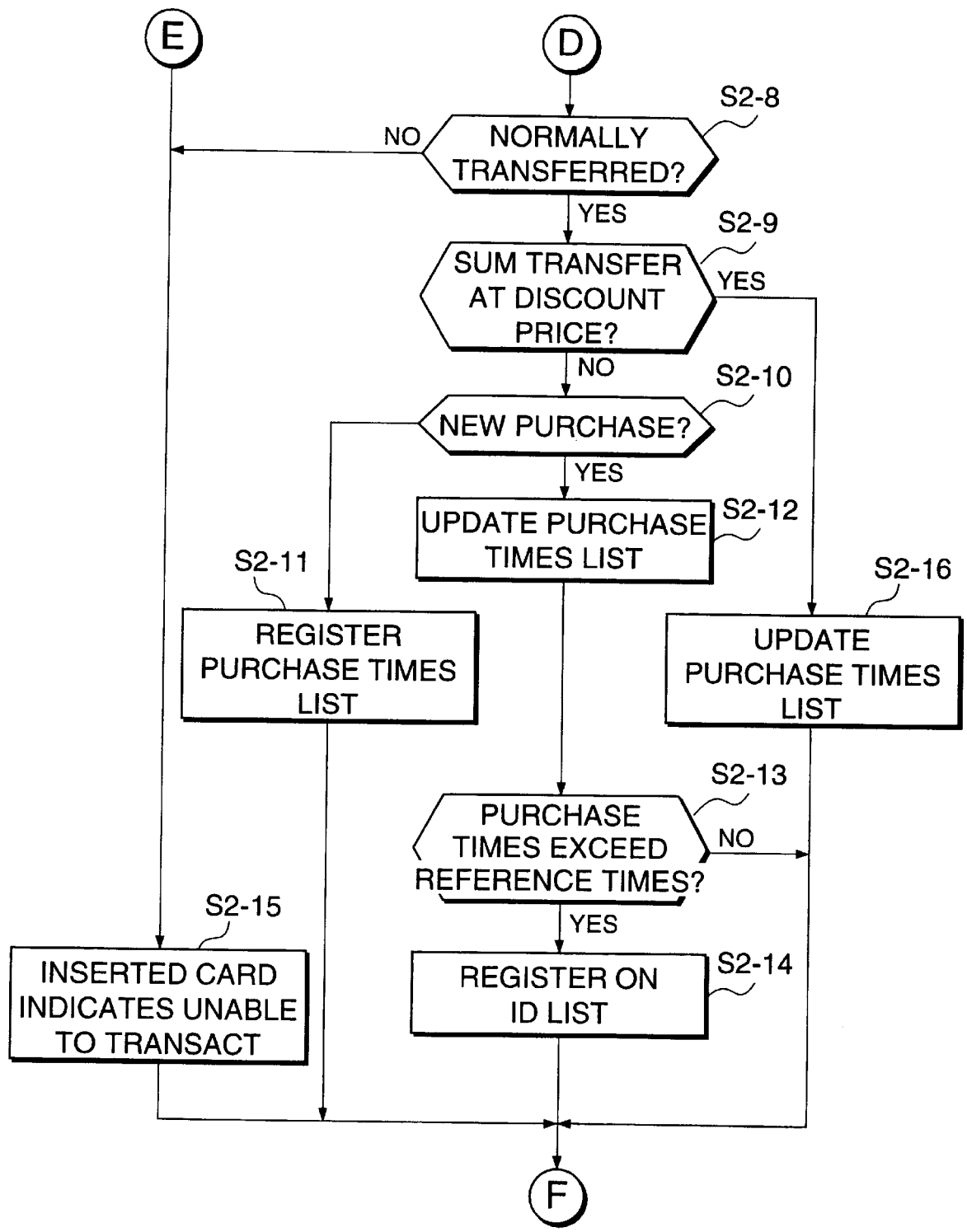
FIG. 8 is a flowchart showing the operation of an automatic selling system in accordance with the third embodiment of the present invention.

The operation of the automatic selling system in accordance with the third embodiment will now be described. FIGS. 7 and 8 show the operational flow of the automatic selling system. Some of the steps in FIGS. 7 and 8 correspond to steps in FIGS. 2 and 3, and, therefore, include the same reference labels as the corresponding steps in FIGS. 2 and 3. As shown in FIGS. 7 and 8, if the personal ID code read in the step S2-3 is found on the personal ID code list in the step S2-4, the microcomputer 2 reads the current date from the calendar unit 10 and the birthday of the purchaser from the purchaser's IC card 8 (S6-1), and compares the two dates (S6-2). If the two dates coincide with each other, the birthday discount price if higher than the ordinary discount price, is set for settlement (S6-3). When the two dates do not coincide with each other, the ordinary discount price is set for settlement (S2-5).

As described above, according to the third embodiment of the present invention, there is provided an automatic selling system which offers added benefit to purchasers in accordance with their individual purchase records and birthdays.

Figure 9:
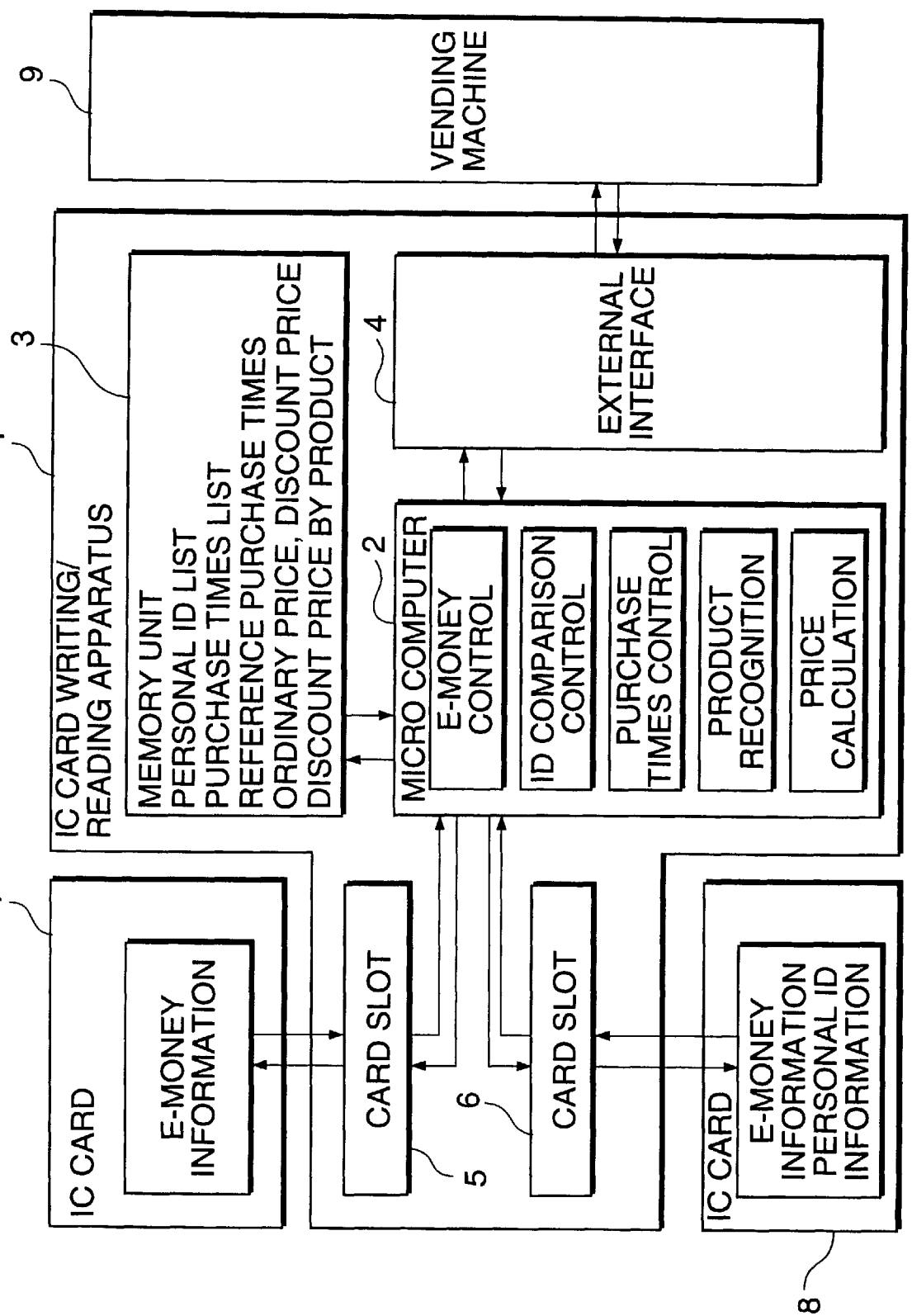
FIG. 9 is a block diagram of an automatic selling system in accordance with a fourth embodiment of the present invention.

Now, an automatic selling system in accordance with the fourth embodiment of the present invention will be described. This automatic selling system is the automatic selling system in accordance with the first embodiment wherein different discount rates for different products can be set. FIG. 9 shows the configuration of the automatic selling system in accordance with the fourth embodiment. As shown in FIG. 9, this automatic selling system is the automatic selling system of FIG. 1 wherein a storage area for different discount prices for different products is secured in the memory unit 3 of the IC card writing/reading apparatus 1. The discount prices stored in the memory unit 3 are described by discount rates for products sold by the vending machine 9, for example, as shown in FIG. 10.

Figure 11:
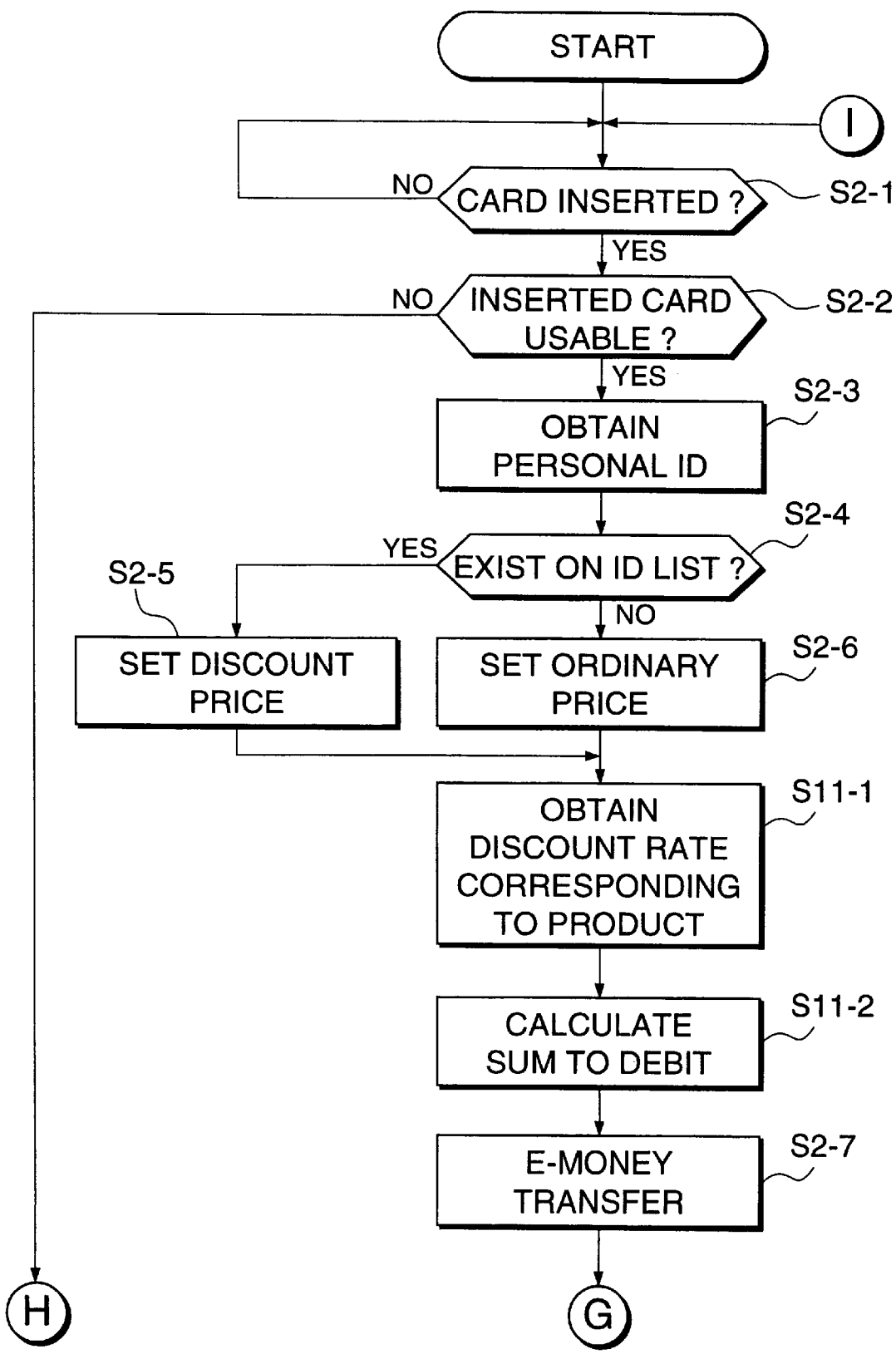
FIG. 11 is a flowchart showing the operation of an automatic selling system in accordance with the fourth embodiment of the present invention.
Figure 12:
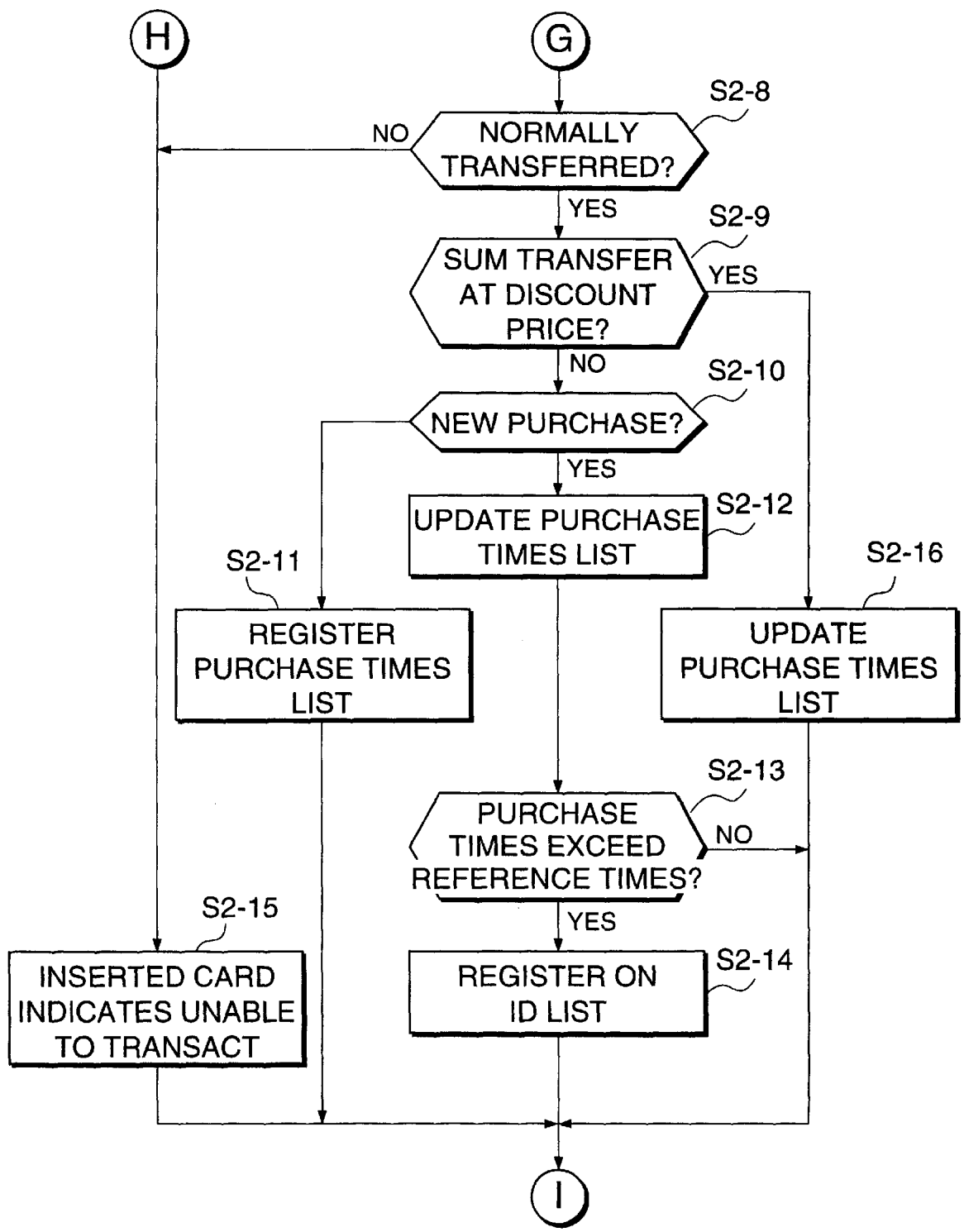
FIG. 12 is a flowchart showing the operation of an automatic selling system in accordance with the fourth embodiment of the present invention.

The operation of the automatic selling system in accordance with the fourth embodiment will now be described. FIGS. 11 and 12 show the operational flow of the automatic selling system. Some of the steps in FIGS. 11 and 12 correspond to steps in FIGS. 2 and 3, and, therefore, include the same reference labels as the corresponding steps in FIGS. 2 and 3. As shown in FIGS. 11 and 12, the microcomputer 2 receives the information on the purchased products from the vending machine 9 and sets the ordinary price or the discount prices for settlement (S2-5 or S2-6). Then, the microcomputer 2 makes the following processing instead of, as in the case of the first embodiment, transferring the set price multiplied by the purchased quantity from the purchaser's IC card 8 to the seller's IC card 7.

Namely, after setting the ordinary price or the discount prices for settlement (S2-5 or S2-6), the microcomputer 2 refers to the discount prices of the purchased products to read their discount rates (S11-1). Then, the microcomputer 2 multiplies the normal price or discount price (set in the step S2-5 or S2-6) by the purchased quantity and the discount rate for each product to find the purchase amount of money for each product and finds the total purchase amount of money for all the purchased products as the sum of money to be drawn (S11-2). Electronic money equivalent to the sum of money to be drawn is transferred from the purchaser's IC card 8 to the seller's IC card 7.

As described above, according to the fourth embodiment of the present invention, added benefit such as discount can be offered to purchasers in accordance with their purchasing records. and purchased products. Sellers using the automatic selling system can set different discount rates for different products to sell, at larger discount rates, more of the products of which the sales they want to promote.

Figure 13:
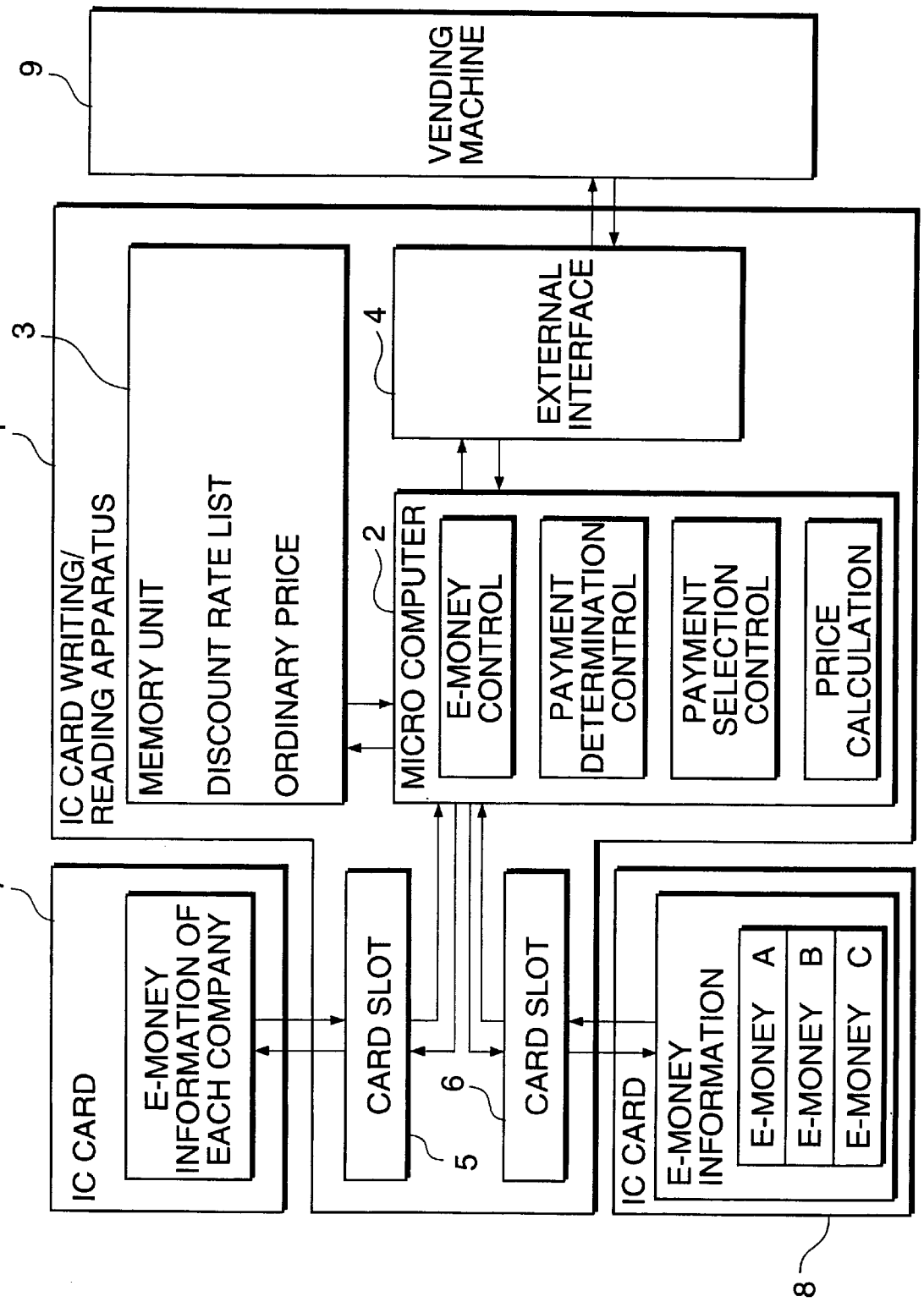
FIG. 13 is a block diagram of an automatic selling system in accordance with a fifth embodiment of the present invention.

Now, an automatic selling system in accordance with the fifth embodiment of the present invention will be described. FIG. 13 shows the configuration of the automatic selling system in accordance with the fifth embodiment. In FIG. 13, the numeral 9 indicates a vending machine which stores and dispenses products to purchasers. The numeral 1 represents an IC card writing/reading apparatus which collects money for products dispensed to purchasers.

The IC card writing/reading apparatus transfers e-money between two IC cards. A seller's IC card for collection 7 and a purchaser's IC card for payment 8 are fitted in the IC card writing/reading apparatus. The seller's IC card 7 is in advance fitted in a card slot 5 of the IC card writing/reading apparatus 1. The purchaser's IC card 8 is fitted in a card slot 6 by the purchaser when the purchaser buys products. The seller's IC card 7 may store two or more kinds of e-money, or two or more seller's IC cards 7 may be used, each storing a single kind of e-money. The purchaser's IC card 8 may store a single kind of e-money or two or more kinds of e-money.

The IC card writing/reading apparatus 1 is connected to the vending machine 9 through an external interface 4 by control wires. When the purchaser's IC card 8 is inserted in the card slot 6, a microcomputer 2 of the IC card writing/reading apparatus 1 transfers, from the purchaser's IC card 8 to the seller's IC card 7, e-money for the products which the purchaser bought from the vending machine 9.

The IC card writing/reading apparatus 1 has a memory unit 3, wherein the ordinary price of products and a list of discount rates are stored. In the discount rate list are different discount rates for different kinds of e-money as shown in FIG. 14. Here, the e-money issued from each organization is regarded as one kind of e-money.

Figure 15:
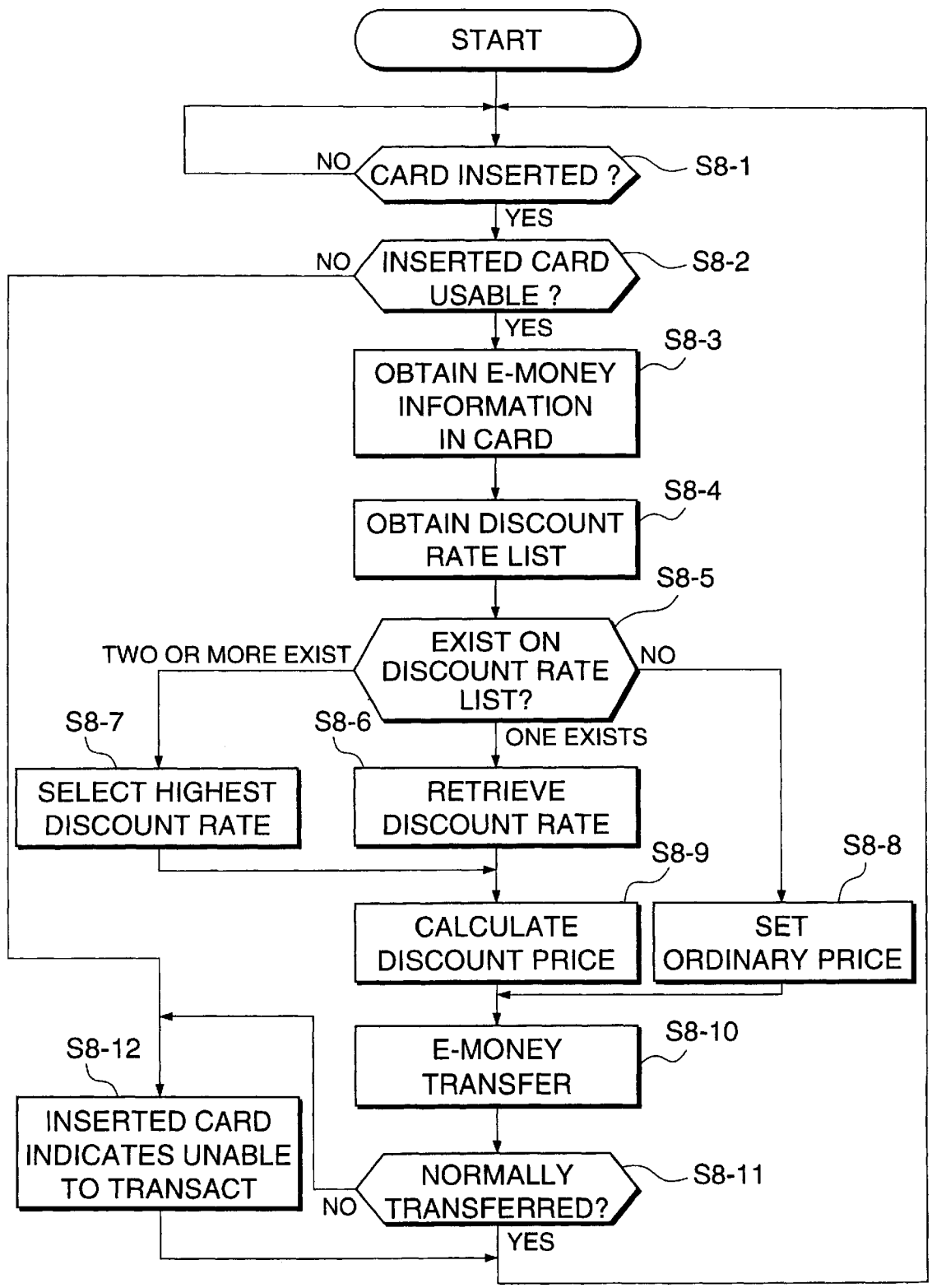
FIG. 15 is a flowchart showing the operation of an automatic selling system in accordance with the fifth embodiment of the present invention.

The operation of the automatic selling system in accordance with the fifth embodiment will now be described. FIG. 15 shows the operational flow of the automatic selling system. As shown in FIG. 15, when a purchaser's IC card 8 is inserted in the card slot 6 (S8-1), the microcomputer 2 determines whether the purchaser's IC card 8 is usable or not in the IC card writing/reading apparatus 1 (S8-2).

When the purchaser's IC card 8 is determined to be usable, the microcomputer 2 reads the e-money information stored in the memory of the purchaser's IC card 8 and recognizes usable kinds of e-money (S8-3). Then, the microcomputer 2 reads the list of discount rates stored in the memory unit 3 (S8-4)

Next, the microcomputer 2 checks the list of discount rates to determine whether a discount rate is prescribed for each kind of e-money recognized as usable in the step S8-3 or not (S8-5). When none of the kinds of e-money recognized as usable has a prescribed discount rate, the ordinary price of products stored in the memory unit 3 is set for settlement (S8-8). When a discount rate is prescribed for one of the kinds of e-money recognized as usable, the ordinary price of the products is multiplied by the discount rate to find the discount price (S8-6 and S8-9). When two or more kinds of e-money have each prescribed discount rate, the highest discount rate is chosen (S8-7) and the ordinary price is multiplied by the discount rate to find the discount price (S8-9).

Then, the purchaser pushes one of the product selection buttons of the vending machine 9, which sends information on the purchase quantity to the microcomputer 2. The microcomputer 2 transfers e-money equivalent to the price set in the step S8-9 or S8-8 multiplied by the purchase quantity from the purchaser's IC card 8 to the seller's IC card 7 (S8-10). If a discount price was set for settlement in the step S8-9, e-money of the kind whose discount rate was used in the step S8-9 is transferred. If the ordinary price was set for settlement in the step S8-8, one of the kinds of e-money recognized as usable in step S8-3 is transferred.

Then, the microcomputer 2 determines whether the money has been normally transferred (S8-11). When the transfer is normally completed, the purchaser requests the vending machine 9 to dispense a product selected by a product selection button, and the microcomputer 2 returns to S8-1.

If the product purchaser's IC card 8 inserted into a card slot 6 is determined to be unusable by an IC card writing/reading apparatus 1 in S8-2, and when the sum-of-money information has not been transferred normally in S8-11, the purchaser is notified of invalidity of the inserted card (S8-12), and the microcomputer 2 returns to S8-1. Thus, the fifth embodiment of the present invention has been described. As shown, according to the vending machine of this embodiment, a product can be sold. by selecting a kind of electronic money available to a purchaser with which the product can be offered most inexpensively.

Of course the above embodiments can be combined as appropriate. In the above embodiments, examples were described in cases where all the ordinary prices of products to be sold by vending machines are the same. Even when ordinary prices vary according to kinds of products, through controlling the above regular prices and discount rates by product, the embodiments can be applied and the same effects can be obtained.

The present invention can be applicable to vending machines for drinking water, cigarettes and so on. When a user's frequency of use or sum of money used meets prescribed conditions, service such as discounting selling prices and offering products free of charge can be provided. Moreover, service such as offering giveaways to the user from a seller are possible by notifying the seller owning the vending machine that the prescribed conditions are met.

The present invention can be applied when collecting fees at parking lots. When a user's frequency of use, sum of money used, time used, etc. meet the prescribed conditions, service such as discounting parking fees and offering one-hour free parking can be provided. Another use if for collecting coin operated locker fees. When a user's frequency of use, sum of money used, time used, etc. meet the prescribed conditions, service such as discounting fees, offering free one-day locker use, etc. can be provided.

Furthermore, it can be applied to a meal-ticket vending machine selling meal tickets at a cafeteria. When user's frequency of use or sum of money used meets the prescribed conditions, service such as selling tickets at discounted prices and offering free meal tickets can be provided. Similarly, the above vending machine can be applied to facilities such as a self-service gas station, a self-service car wash and a laundromat.

Also, at convenience stores, etc. products can be sold without human attendance, and such service can be provided to users through recording data on frequency of use by store. As a frequency of use, purchase amount of money, the number of times of purchase, etc. are used. When a frequency of use meets prescribed conditions, service such as sale at discounted prices and making gifts of money and other articles can be provided to users.

To improve sales at each vending machine, it is effective for each vending machine to have its own information including the number of times of purchase. More specifically, it can be achieved by introducing an off-line system, where a system is closed within a single vending machine unit.

In the above embodiment, electronic money corresponding to prices of products were transferred from a product purchaser's IC card 8 to a product seller's IC card 7. Instead of the product seller's IC card 7, however, an appropriate device to handle electronic money may be provided in an IC card writing/reading apparatus 1 so that electronic money corresponding to the product prices is transferred from the purchaser's IC card 8 to this device.

Further, as the number of times of purchase used in the first to fourth embodiments, in addition to the number times of purchasing products/service, the number of times fees are collected, numeric values corresponding to gross amounts, numeric values according to products/services, numeric values which vary by lottery, etc. may be used.

Also, each of the above embodiments is described that a purchaser makes a payment with an IC card having electronic money data. However, even when a purchaser makes a payment with a credit card that is an IC card, each of the above embodiments can be similarly applied by providing an IC card writing/reading apparatus to credit a sum to the purchaser's account instead of electronic money transfer.

Further, by additionally providing the IC card writing/reading apparatus of the present invention, the seller can easily adopt this system and no other device is necessary. Also, because the memory area of the IC card is not used, it does not cause a load on the user's IC card, thereby enabling the user to make use of the system without limitation.

When a product or service is purchased by IC card with only one operation, a user can make a payment and a seller can offer a point service, which is a simple and low cost operation with no other steps required for the seller, the system, and the user, thereby producing a great effect of utilizing an IC card having both money information and a user identifying information.

Thus, according to the present invention, at each vending machine without human attendance, additional service corresponding to each purchaser can be provided at a point of sale, thereby improving the attraction of each vending machine. Also, when providing such service, it is possible to take some of the load off the IC card.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

The preceding has been a description of the preferred embodiment of the invention. It will be appreciated that deviations and modifications can be made without departing from the scope of the invention, which is defined by the appended claims.

What is claimed is:

1. A vending machine utilizing an IC card, the IC card having money information with which payments can be made and identifying information with which the IC card or an owner/user of the IC card can be identified, the vending machine comprising:

an IC card reading means for reading the money information and the identifying information stored in the IC card;

a charge collecting means for collecting a sum of money charged for products or services to be sold;

a storing means for storing frequency-of-transaction information associated with the identifying information read by the IC card reading means, the frequency-of-transaction information indicating a degree of use of the IC card, and condition information that indicates a reference condition at which to offer an additional benefit; and a control means to determine whether to offer an additional benefit based on the frequency-of-transaction information and the condition information.

2. An IC card processing apparatus using an IC card storing money information with which payments can be made, and identifying information with which an IC card or an owner of the IC card or a user can be identified, the IC card being connected to a vending machine selling products or services, comprising:

a connector connected to the vending machine;

an IC card reading means for reading the money information and the identifying information stored in the IC card;

a charge collecting means collecting a sum of money charged for products or services to be sold;

a storing means for storing frequency-of-transaction information read by the IC card reading means, the frequency-of-transaction information indicating a degree of use of the IC card and condition information that indicates reference conditions at which to offer an additional benefit; and a control means for determining whether to offer the additional benefit based on the frequency-of-transaction information and the condition information.

3. A selling method using a vending machine coupled to an IC card via an IC card reader, the IC card having money information with which payments can be made and identifying information with which the IC card or an owner/user of the IC card can be identified, the vending machine having a memory unit, the method comprising:
   reading the money information and identifying information from the IC card;
   collecting a sum of money charged for the products or services sold;
   storing in the memory unit frequency-of-transaction information associated with the identifying information read from the IC card, the frequency-of-transaction information indicating a degree of use of the IC card; and
   offering an additional benefit when the frequency-of-transaction information associated with the identifying information meets a predetermined condition.

4. A selling method according to claim 3, wherein the money information is electronic money information which can be settled electronically.

5. A selling method according to claim 3, wherein the money information is credit information capable of charging electronically.

6. A selling method according to claim 3, wherein the frequency-of-transaction information includes at least one of a number of times fees are collected from the IC card, a quantity or kinds of products or service whose fees are collected, or a value corresponding to the amount of charges collected.

7. A selling method according to claim 3, wherein the predetermined condition includes a specified degree of use of the IC card during a specified time period.

8. A selling method according to claim 3, wherein the additional benefit includes at least one of discounting charges, offering products free of charge, or offering services free of charge.

9. A selling method according to claim 8, wherein discount rates are stored corresponding to kinds of products or services, and the discounting of charges includes discounting based on the discount rate.

10. A selling method according to claim 3, wherein the identifying information includes personal information of an owner/user, and wherein the predetermined condition includes information related to personal information.

11. A selling method according to claim 10, wherein the personal information includes a birthday of an owner/user of the IC card, and wherein the predetermined condition includes whether a transaction date is the birthday.

12. A selling method according to claim 3, wherein the product or service to be sold is a use of parking lots, and the frequency-of-transaction information includes at least one of a number of times a parking lot is used, a sum of money used, or an amount of time used, and the additional benefit includes a discount for use of the parking lot.

13. A selling method according to claim 3, wherein the products or services to be sold are products or services sold automatically at convenience stores without human attendance, and the frequency-of-transaction information includes at least one of a purchase amount of money or a number of times used.

14. A vending machine utilizing an IC card, the IC card having money information with which payments can be made and identifying information with which the IC card or an owner/user of the IC card can be identified, the vending machine comprising:
   an IC card reader that reads the money information and the identifying information stored in the IC card;
   a memory unit that stores frequency-of-transaction information associated with the identifying information read by the IC card reader, the frequency-of-transaction information indicating a degree of use of the IC card, and condition information that indicates a reference condition at which to offer an additional benefit; and
   a controller that controls the IC card reader to modify the money information to collect a charge for products or services to be sold, and that determines whether to offer the additional benefit based on the frequency-of-transaction information and the condition information.

15. A vending machine according to claim 14, wherein the money information is electronic money information which can be settled electronically.

16. A vending machine according to claims 14, wherein the money information is credit information in which a charging operation is performed electronically.

17. A vending machine according to claim 14, wherein the frequency-of-transaction information includes a value corresponding to at least one of a number of times fees are collected from the IC card, or an amount of fees collected from the IC card.

18. A vending machine according to claim 14, wherein the memory unit stores time-period information and wherein the controller determines whether to offer the additional benefit based on degree of use of the IC card during a time period indicated by the time-period information.

19. A vending machine according to claim 14, wherein the additional benefit is atleast one of discounting charges electronically collected by the controller, offering products free of charge, or offering services free of charge.

20. A vending machine according to claim 19, wherein the memory unit stores discount rates correlating with kinds of products or service, wherein discounting charges includes applying a discount charge based on the discount rate using the controller.

21. A vending machine according to claim 14, wherein the identifying information is personal information of an owner/user of the IC card, and wherein the controller determines whether to offer the additional benefit further based on the personal information.

22. A vending machine according to claim 21, wherein the personal information includes a birthday of the owner/user, and the controller determines whether to offer the additional benefit based on whether a transaction date is the birthday.

23. A vending machine according to claim 14, wherein the frequency-of-transaction information includes a number of transactions using the IC card, and the condition information includes a reference number of transactions, and wherein the controller determines to offer the additional benefit when the number of transactions using the IC card has reached the reference number of transactions.

24. A vending machine according to claim 14, wherein the memory unit stores an ordinary price, a discount price, and wherein the controller, and identifying information previously read from IC cards, and wherein the controller determines to apply the discount price when the identifying information read from the IC card corresponds to identifying information previously read from IC cards.

25. A vending machine according to claim 14, wherein the frequency-of-transaction information includes transaction dates, and wherein the controller deletes frequency-of-transaction information from the memory unit that corresponds to transaction dates prior to a reference time period.

26. An IC card processing apparatus using an IC card, the IC card having money information with which payments can be made and identifying information with which the IC card or an owner/user of the IC card can be identified, the apparatus comprising:

an IC card reader that reads the money information and the identifying information stored in the IC card;

a memory unit that stores frequency-of-transaction information associated with the identifying information read by the IC card reader, the frequency-of-transaction information indicating a degree of use of the IC card, and condition information that indicates a reference condition at which to offer an additional benefit; and a controller that controls the IC card reader to modify the money information to collect a charge for products or services to be sold, and that determines whether to offer the additional benefit based on the frequency-of-transaction information and the condition information.

27. An IC card processing apparatus according to claim 26, wherein the money information is electronic money information which can be settled electronically.

28. An IC card processing apparatus according to claim 26, wherein the money information is credit information which can be charged electronically.

29. An IC card processing apparatus according to claim 26, wherein the frequency-of-transaction information corresponds to at least one of a number of times fees are collected from the IC card, numeric values for kinds of products/ services whose fees are collected, or an amount of charges collected.

30. An IC card processing apparatus according to claim 26, wherein the memory unit stores time-period information and wherein the controller determines whether to offer the additional benefit based on degree of use of the IC card during a time period indicated by the time period information.

31. An IC card processing apparatus according to claim 30, wherein the memory unit stores discount rates corresponding to kinds of products or service, and wherein discharges includes applying a discount charge based on the discount rates using the control means.

32. An IC card processing apparatus according to claim 26, wherein the additional benefit is at least one of discounting charges which are electronically collected by the controller, offering products to be sold free of charge, or offering services to be sold free of charge.

33. An IC card processing apparatus according to claim 26, wherein the identifying information includes personal information of an owner/user of the IC card, and wherein the controller determines whether to offer the additional benefit further based on the personal information.

34. An IC card processing apparatus according to claim 26, wherein the personal information includes a birthday of the owner/user, and the controller determines whether to offer the additional benefit based on whether a transaction date is the birthday.

35. An IC card processing apparatus according to claim 26, wherein the controller controls the vending machine through the connector.

36. An IC card processing apparatus according to claim 26, wherein the IC card processing apparatus is configured to have substantially a same shape as that of a sum-of-money collecting apparatus collecting notes or coins, and the IC card processing apparatus and the sum-of-money collecting apparatus are selectively mounted to the vending machine.

* * * * *